R. O. PERROTT.
APPARATUS FOR DRYING WARES MADE FROM TENDER CLAY.
APPLICATION FILED AUG. 14, 1913.

1,215,849.

Patented Feb. 13, 1917.
2 SHEETS—SHEET 1.

Witnesses:
Edward Maxwell
James R. Hodder

Inventor:
Ralph O. Perrott,
by Geo. H. Maxwell,
Attorney.

R. O. PERROTT.
APPARATUS FOR DRYING WARES MADE FROM TENDER CLAY.
APPLICATION FILED AUG. 14, 1913.
1,215,849.
Patented Feb. 13, 1917.
2 SHEETS—SHEET 2.
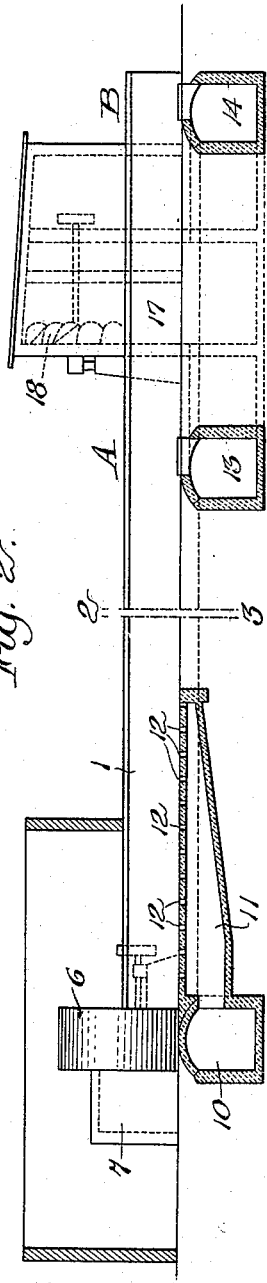
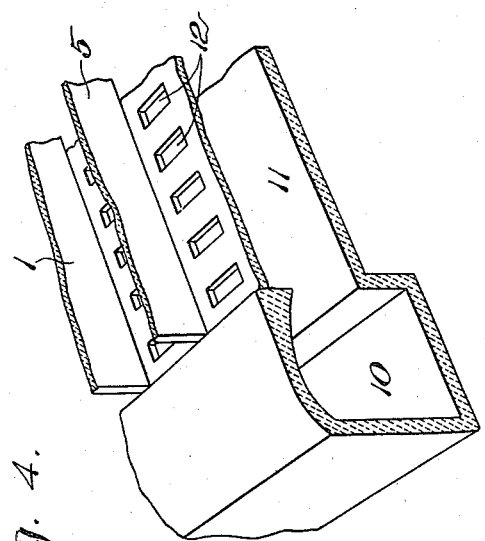
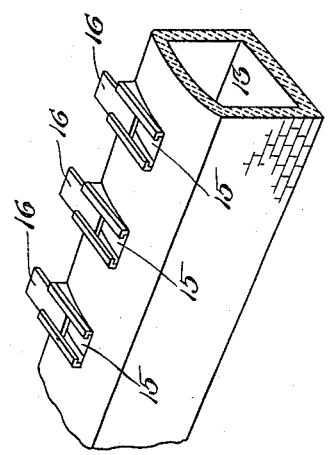
Witnesses:
Edward Maxwell
James R. Hodder.
Inventor:
Ralph O. Perrott,
by Geo. St. Maxwell,
Attorney.

UNITED STATES PATENT OFFICE.

RALPH O. PERROTT, OF BUCYRUS, OHIO, ASSIGNOR TO AMERICAN CLAY MACHINERY COMPANY, OF CHICAGO, ILLINOIS, A CORPORATION OF OHIO.

APPARATUS FOR DRYING WARES MADE FROM TENDER CLAY.

1,215,849. Specification of Letters Patent. Patented Feb. 13, 1917.

Application filed August 14, 1913. Serial No. 784,737.

*To all whom it may concern:*

Be it known that I, RALPH O. PERROTT, a citizen of the United States, and resident of Bucyrus, county of Crawford, State of Ohio, have invented an Improvement in Apparatus for Drying Wares Made from Tender Clay, of which the following description, in connection with the accompanying drawings, is a specification, like letters on the drawings representing like parts.

This invention relates to apparatus for drying wares made from clay and its object is to improve and perfect such driers.

In the manufacture of clay wares it has been customary to subject the ware to a drying process, one of such processes being to run the ware on cars, through tunnels through which a draft was forced. This method, however, has proven unsatisfactory, as different clays require different treatment, and in many kinds of clay it is impossible to dry the ware made therefrom by such tunnel driers, without causing checking and damage thereto. This is particularly the case with the so-called tender clays, which oftentimes require an unusually long time to dry the same, without causing checking. In the drying of such clay wares, the moisture contained in the green ware is extracted by rapid capillary action, caused by the drying heat applied to the exterior of the ware, and consequently the danger of checking and ruining the ware, by such rapid drying is especially present when treating ware made of tender clays.

I have discovered that by first subjecting clay wares, particularly the wares made of tender clay, to a preheating action, whereby the ware is allowed to stand subject to a substantially uniform temperature and given time to cure, that it may then be advanced rapidly and continuously through the ordinary drying tunnel and will be quickly dried without risk or danger of being checked. In carrying out my present invention, therefore, I have provided a novel form of drier, having a preheating or curing zone in which the green clay ware may be first placed and allowed to stand, subject to a temperature which can readily be regulated to suit each particular clay being treated, and then may be advanced rapidly and continuously through the ordinary drying tunnel and subjected to the continuously increasing heat until dried.

In the preferred form of my invention, and as herein shown, I have provided such a preheating or curing zone as a section or portion of the drying tunnel of the apparatus and arrange such preheating section of sufficient length so that the ware in passing therethrough will receive a substantially uniform degree of heat before being advanced into the rest of the drying tunnel, where the heat is continuously increasing during such advancing of the ware.

Other features of the invention, novel combinations of parts, and details of construction, will be hereinafter more fully pointed out and claimed.

Referring to the drawings, wherein a preferred embodiment of the invention is illustrated, Figure 1 is a plan view of my improved drying apparatus;

Fig. 2 is a vertical sectional view;

Figs. 3 and 4 are enlarged details, showing the means of admitting heat to the drying tunnels and regulating the heat supply in the preheating or curing zone.

Figure 1:
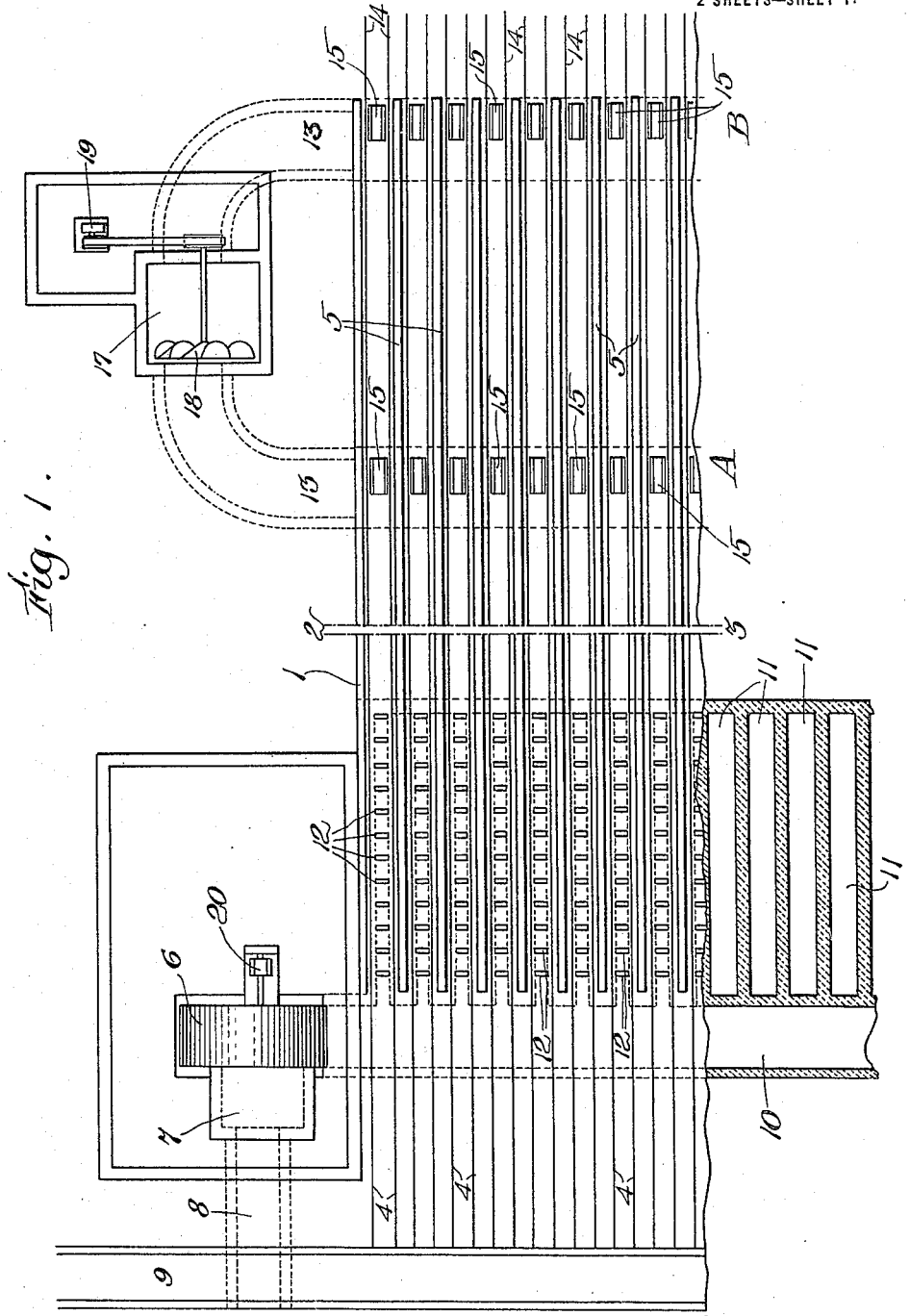

As herein shown, I prefer to employ a plurality of drying tunnels constituting a single drying apparatus, although the invention, of course, is applicable to a single drying tunnel. It is customary to mount or stack the green ware upon cars, switch said cars on to tracks which pass through the tunnels, each tunnel being of suitable height and width to receive the same, and as the cars are advanced from time to time through the tunnels, a car with the completely dried ware will be detached from the exit end of the tunnel as another car with fresh green ware is attached to the train at the entrance end of the tunnel.

A plurality of such tunnels is illustrated in Figs. 1 and 2 at 1, such tunnels being of any suitable length, the drawings illustrating each end of these tunnels with the intermediate length omitted at the dotted lines 2 and 3. Each tunnel is of usual form and is provided with a pair of tracks 4, the adjacent side walls 5 of each tunnel acting as partitions for the adjoining tunnels, as clearly shown in Fig. 1, any suitable number of such adjacent tunnels being arranged to constitute a drying apparatus of a capacity desired. At the outgoing or exit end of the tunnel, i. e. the left, viewing Figs. 1 and 2, I provide a suitable fan or blower at 6, to draw heat through supply passages 7, 8 and 9, and force the same through a conduit 10, said conduit being preferably at right angles to and under the plurality of tunnels constituting the drier, this conduit having a series of lateral branches 11 under each tunnel. The lateral branches 11 are in communication with each of the respective tunnels under which they are placed, by a series of openings 12, so that as heated gases are forced by the blower 6 through the conduit 10, such heated gases will flow through the several branches 11, up through the openings 12, and into the end portions of each tunnel. These tunnels are provided with doors in the usual manner, closing the same at either end, and thus inclosing a train of cars with the clay ware throughout the entire length of each tunnel, in various stages of the drying process.

In connection with each one of the drying tunnels, I provide a preheating or curing section, as indicated from A to B, in Figs. 1 and 2, and in this preheating or curing section, which is in open communication with the rest of the drying portion of the respective tunnels, I provide means for maintaining a substantially uniform degree of heat, so that as the cars carrying the green ware pass through said section, from B to A, they will not be subject to an increasing amount of heat, but will be subjected to a substantially uniform degree of curing heat. To this end I provide subconduits 13 substantially at right angles to the length of the tunnels 1 and therefore crossing each tunnel and having openings 15 from the roof of the conduits 13 into the floor of each tunnel which these conduits cross. These openings 15 are also provided with slides or dampers 16, which may be of any suitable form, adapted to either partially or wholly open or completely close the vent openings 15. The conduits 13 and 13 lead to a blower chamber 17, where a fan or blower 18 is rotated to create a suction through the conduits 13 and expels the air drawn therethrough into the open air. Thus the entire length of the tunnels 1, and the conduits 10, 11, 13, and 13 are subject to drafts created by the force blower 6, and suction blower 18. Suitable motors 19 and 20 to actuate the fans 18 and 6 respectively, may be provided adjacent their respective fans.

By partially opening the slide 16 in the vent passages 15 from the tunnels to the subjacent conduits 13 and 13, I am able to secure a predetermined degree of heat in the preheating or curing section of each tunnel from A to B. As this section is of sufficient length to permit the cars carrying green ware to be successively moved therethrough without being beyond the limits of this section, the ware carried by each car receives a substantially uniform degree of heat for a predetermined time. Then as the car with its green ware is advanced beyond the limits of the preheating section A to B, the ware is subjected to a continuously increasing degree of heat and consequently to the rapid drying of the ware, until the exit of each tunnel is reached at the left, viewing Figs. 1 and 2, when the doors of the tunnel are opened, the end car with its dried ware is rolled out, the doors closed and the train of cars advanced another car length by the addition of a car with its green ware to the right or entrance end of each tunnel.

My improved tunnel drying apparatus, as above explained, may be advantageously employed in utilizing the waste heat from an adjacent brick kiln, by connecting the passages 8 and 9 therewith, the induced draft created by the blowers 6 and 18 being capable of utilizing such waste heat to the best advantage. If desired, air from the atmosphere may be admitted into the passage 7, which may constitute a mixing chamber, so that the degree of heat forced by the fan 6 into the entrance end of the tunnels can be regulated to attain the best results. It will be found that some experimenting may be necessary with the clay wares of different localities as well as with different sets of wares from the same clay, in determining just the best amount of temperature to be provided in the preheating or curing zone A to B, the slides or dampers 16 serving to control the heat received from the forward portion A of the section, and permitted to pass through the section to the corresponding vent openings in the end conduit 14. While I prefer to utilize waste heat as above noted, it is of course feasible to utilize any artificial heating of the air drawn into the conduits 8 and 9, as may be convenient or desirable.

By means of my improved drying apparatus, I am enabled to subject clay ware to a very rapid drying and more rapid progression through the drying tunnels 1, without risk of checking or damaging the ware, even when such ware is made from tender clay than has heretofore been possible.

Having described my invention, what I claim as new and desire to secure by Letters Patent is:

1. An apparatus of the kind described comprising a drying tunnel to receive clay ware, means to apply a relatively high degree of heat through one section of said tunnel, and means to supply a relatively low primary curing heat to the clay ware in another section in advance of said highly heated section, said heat applying means including means to create forced draft through both said sections, and mechanism to regulate the draft and control the heat to each section.

2. An apparatus of the kind described, comprising a plurality of drying tunnels, a source of heat supply common to all of said tunnels at one end, and means at the other end of said tunnels to adjust the heat supply through said tunnels in a predetermined length of each tunnel.

3. An apparatus of the kind described, comprising a plurality of drying tunnels, a source of heat supply common to all of said tunnels at one end, and means at the other end of said tunnels to adjust the heat supply through said tunnels in a predetermined length of each tunnel, in combination with means to create a forced draft for the heat supply, and draft creating means at the other end of the tunnels.

4. An apparatus of the kind described, comprising a plurality of longitudinal drying tunnels, a transverse conduit for heat supply at the exit end of said tunnels, having passages from said conduits to each tunnel intercepted by it, and a plurality of transverse tunnels near the entrance ends of said tunnels having vent openings from each tunnel therein, whereby a preheating zone is provided in each tunnel near the entrance end, means to create a draft therethrough, and means to regulate the draft supply through said preheating zone of each tunnel.

In testimony whereof, I have signed my name to this specification, in the presence of two subscribing witnesses.

RALPH O. PERROTT.

Witnesses:
JOHN S. DEPSHMUTT,
CUSTER P. MADER.

Copies of this patent may be obtained for five cents each, by addressing the "Commissioner of Patents, Washington, D. C."